Oct. 29, 1968   E. C. BEASON   3,408,245
CUTTING AND HEAT SEALING THERMOPLASTIC FILM
Filed Oct. 11, 1965   2 Sheets-Sheet 1
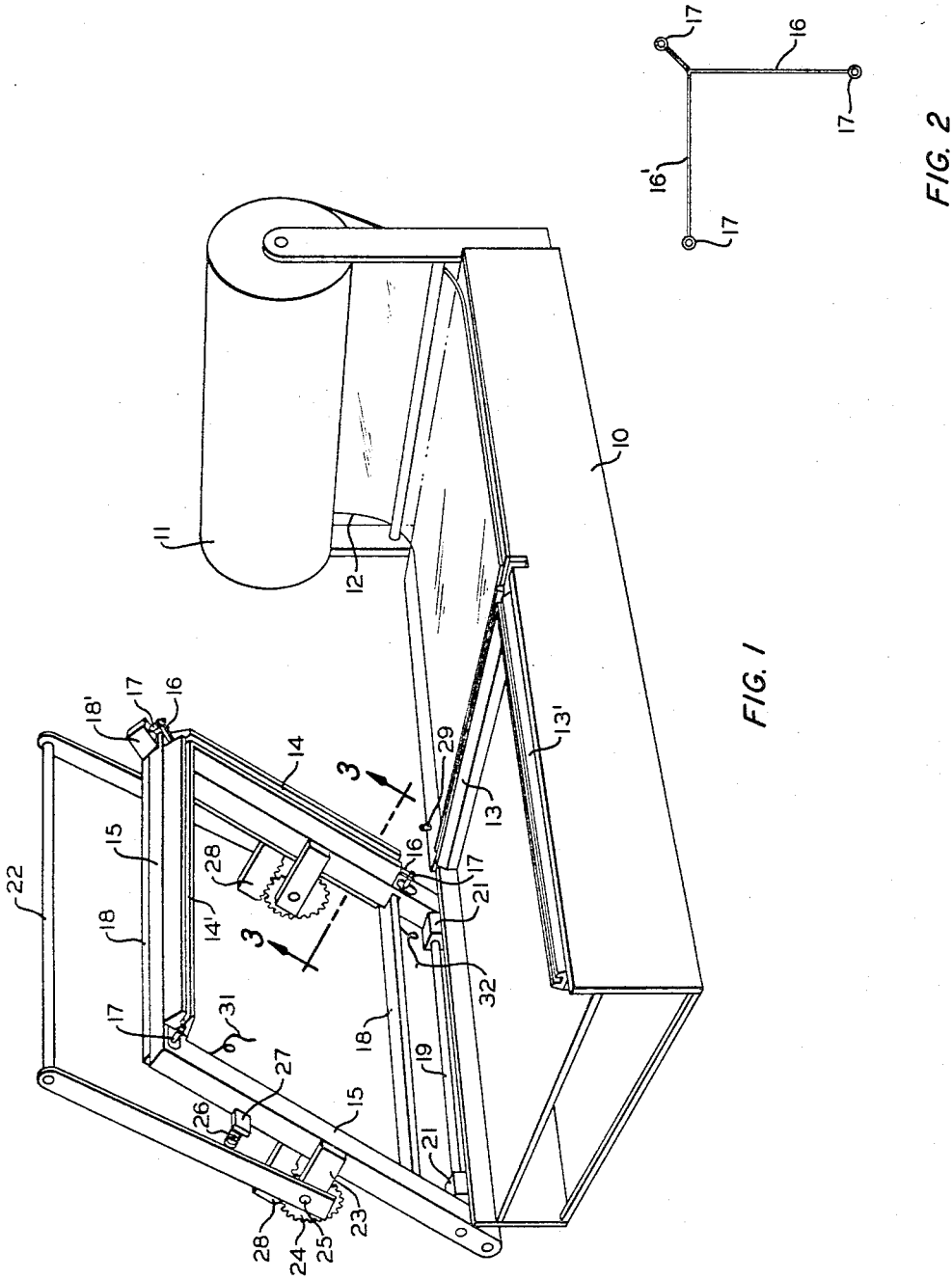
INVENTOR
E. C. BEASON
BY Young and Quigg
ATTORNEYS United States Patent Office 3,408,245
Patented Oct. 29, 1968

3,408,245
CUTTING AND HEAT SEALING
THERMOPLASTIC FILM
Elmer C. Beason, Bartlesville, Okla., assignor to Phillips Petroleum Company, a corporation of Delaware
Filed Oct. 11, 1965, Ser. No. 494,332
2 Claims. (Cl. 156—515)

ABSTRACT OF THE DISCLOSURE

A plastic film cutter and sealer is operated by moving a handle to clamp the film layers to be sealed firmly together on each side of the zone to be cut and sealed and continued movement of the operating handle then causes a rack and pinion gear system to move the frame carrying the heating element through the clamped film sections, cutting and sealing them together.

This invention relates to a method and means for cutting and heat sealing thermoplastic film including both oriented and unoriented film. In one aspect this invention relates to a method and means for cutting and heat sealing thermoplastic film in the operation of packaging articles by wrapping such articles with thermoplastic film and heat sealing the film which forms the wrapping.

It is an object of the invention to provide a method for cutting and heat sealing a plurality of layers of thermoplastic film so that a positive and strong seal is obtained with both oriented and unoriented thermoplastic film. It is also an object of this invention to provide a method and means for packaging articles in an envelope of thermoplastic film so that a strong seal is obtained at the sealed edges of the envelope with either oriented or unoriented plastic film without modification of the procedure or the device when changing from one type of film to another. Still another object of the invention is to provide a method and means for gripping the layers of film to be severed and sealed in a manner so that a strong seal results regardless of the orientation characteristics of the film. Other and further objects of the invention will be apparent to those skilled in the art upon reading the disclosure including the detailed description of the invention and the drawing wherein:

FIGURE 1 is a perspective view of the apparatus of the invention;

FIGURE 2 is a view of the wire which does the cutting and sealing;

Figure 3:
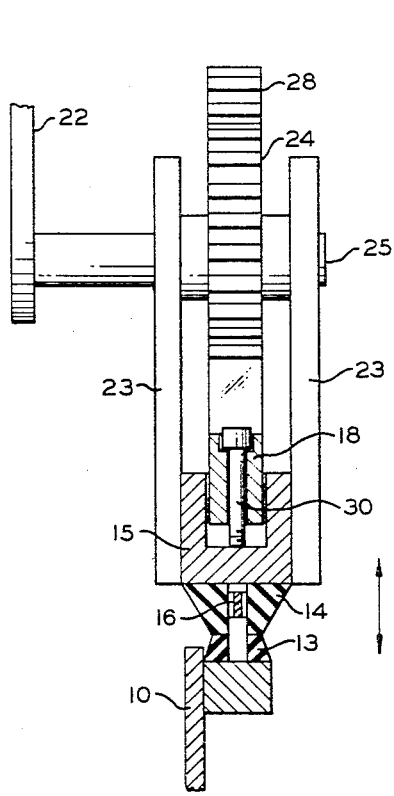
FIGURE 3 is a view along line 3—3 of FIGURE 1.
Figure 4:
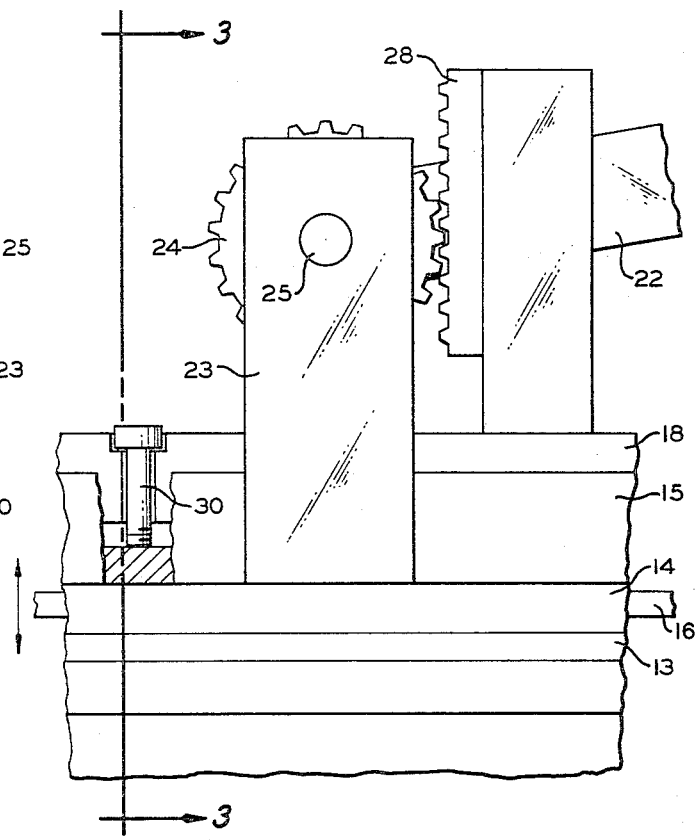
FIGURE 4 is an enlarged elevational view of the area shown in FIGURE 3.

I have discovered that a thermoplastic film cutting and sealing device can be used to seal unoriented or biaxially oriented films of different kinds of thermoplastics if the film is gripped tightly on each side of the line along which the seal is to be made. This can be accomplished by causing a positive pressure to be applied to the film on each side of the cut at the time the cut and seal are made. In packaging an article, the article is placed in the fold of a folded strip of thermoplastic film and the layers of film are cut and sealed by an L-shaped heat sealing and cutting element supported in a first frame which is movable in relation to a second frame to form a clamping means in combination with a base. In operation, the clamping frame closes first as the operating handle is moved to clamp the film layers to be sealed firmly together on each side of the zone or line to be cut and sealed. Upon continued movement of the operating handle, a rack and pinion gear system moves the frame carrying the heating element toward the clamping frame and base overcoming the compression of a spring, thus moving the heating element through the clamped film sections, cutting and sealing them together. The action of the spring causes the layers of film to be held tightly together by positive applied pressure during the cutting and sealing operation so that distortion of the film is prevented.

Current is applied to the heating and cutting wire by closing a switch as the handle is lowered so that an electrical circuit including a timer is activated to pass current through the heating wire for a time determined by a timer in the electrical circuit. The timer is reset when the handle is raised and the switch is opened.

The gripping members can be a pair of matching L-shaped silicon rubber bars having therein a central groove to accommodate the heating wire and to allow the heating wire to pass from the groove in one bar into the groove in the other bar and therefore through the layers of thermoplastic film.

Referring now to FIGURE 1 of the drawing, a bag sealer is shown comprising a work base 10 having a roll 11 of folded plastic film mounted thereon with the fold 12 at the far side. A pair of grooved pressure bars 13 and 13' are positioned on the work table and opposed grooved pressure bars 14 and 14' are mounted on press frame indicated at 15. The opposed pressure bars serve to grip and hold the plastic film and the grooves provide a space for a hot wire 16 to pass through the film, simultaneously cutting and sealing the edges of the bag. The hot wire 16 is carried by insulating posts 17 on rectangular frame 18. A projection 18' supports the hot wire 16 at the angle where 16 and 16' are joined together as shown in FIGURE 2.

The press frame 15 is preferably made in the form of a channel member as indicated in FIGURE 3. The press frame 15 is pivotally secured to work table 10 by means of shaft 19 supported on work table 10 by blocks 21. Operating handle 22 is pivotally supported by blocks 23 on press frame 15. Pinion 24 is secured by pintle 25 to handle 22 so that pinion 24 is rotated when handle 22 is pressed toward frame 15 compressing spring 26 mounted on block 27 secured to press frame 15. Rack 28 is secured to frame 18 so that frame 18 and hot wire 16 are lowered from the groove in pressure bar 14 into the groove in pressure bar 13, thus passing through the layers of plastic film gripped between the pressure bars cutting them and sealing them together.

Electrical current is supplied via lead wires 31 and 32 to the hot wire 16. A switch 29 is closed by a suitable dog (not shown) on frame 15 so that current passes through wire 16 heating it to cutting and sealing temperature by the time the rack and pinion assembly lowers wire 16 to and through the layers of plastic film. Two or more guide pins 30 limit the movement of frame 18.

Figure 5:
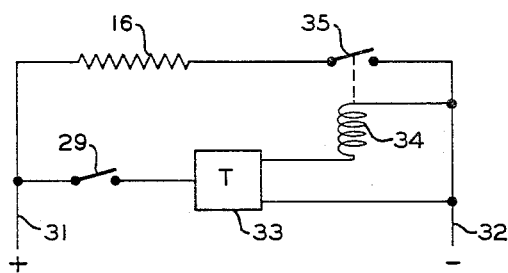
FIGURE 5 shows an electrical circuit which can be used in the device of FIGURE 1.

A suitable electrical circuit is shown in FIGURE 5 for heating the hot wire 16. Closure of the switch 29 activates timer 33 which, in turn, activates solenoid 34, closing switch 35 so as to pass current through hot wire 16. After a suitable interval of time the timer 33 deactivates solenoid 34 so as to open switch 35. The timer 33 is reset when switch 29 is opened by raising handle 22. The timer can be any industrial timer such as a Cramer Type TEC Style A available from the R. M. Cramer Co., Centerbrook, Conn.

The following specific embodiment of the invention will be helpful in attaining an understanding of the invention. The example should be considered as illustrative and not as unduly limiting the invention.

*Example*

A table model heat sealer as shown in FIGURE 1, having an L-shaped cutting and sealing wire about 36 inches long by 0.25 inch wide and 0.030 inch thick made of Nichrome V and having an electrical resistance of 0.0735 ohms per foot, was used to package several industrial products and consumer items such as assorted nuts and bolts, magazines and bed sheets in plastic films of the heat shrinkable type including 1.25 mils polyethylene, 1 mil polypropylene and 1 mil polyvinylchloride. The folded film width in each case was about 14 inches (in the folded condition). For the PVC film the sealing wire temperature was adjusted to reach about 750° F. and the electrical impulse was of 0.2 second duration. For the polyethylene the temperature was set at 800° F., and for the polypropylene, 900° F. The electrical impulse duration was held the same in each case. Upon bringing the clamping jaws together under an average pressure of about one pound per square inch of jaw contact area, the electrical impulse was initiated and the cutting and sealing element moved through the film layers thus cutting and sealing them. The film was held in this clamped position for about 3 seconds following the cutting and sealing of the film to allow the film to cool before separating the jaws. Excellently sealed and trimmed individual packages resulted.

That which is claimed is:

1. In apparatus for making and sealing thermoplastic bags wherein a pivotally mounted sealing and cutting head is pressed upon a folded strip of folded thermoplastic material disposed on a work table, the combination of:
   a first resilient bar having a longitudinal groove therein secured to said sealing and cutting head;
   a second resilient bar having a longitudinal groove therein positioned on said work table so that the grooves of the bars coincide when the sealing and cutting head is pressed upon the work table;
   a heating wire disposed in the groove of said first bar;
   means to move the heating wire out of the groove in the first bar when said sealing and cutting head is pressed upon the work table comprising
      a pinion positioned on said clamping frame;
      a rack positioned on said wire support frame so as to mesh with said pinion;
      a handle pivotally mounted on said clamping frame and operatively connected to said pinion to rotate said pinion;
      a spring mounted on said clamping frame so as to resist movement of said handle; and
   means to pass current through said heating wire when said heating and cutting head is moved toward the work table.

2. In apparatus for making and sealing thermoplastic bags;
   a rectangular work base having an open top;
   a first bar of silicone rubber having a longitudinal groove in its upper surface positioned across said work base with its upper surface raised above the upper surface of the work base;
   a second bar of silicone rubber having a longitudinal groove in its upper surface positioned along one side of said work base normal to and level with said first bar;
   a clamping frame pivotally connected to the upper surface of said work base opposite said second bar;
   a pair of silicone rubber bars having longitudinal grooves secured to the clamping frame so that the grooves of the bars on the clamping frame coincide with the grooves in the bars on said work base when the clamping frame is pivoted downwardly over said work base;
   a wire support frame movably secured to said clamping frame;
   a wire supported on said wire support frame so as to be positioned in the grooves of the silicone rubber bars on said clamping frame;
   means to move said wire support frame so as to move said wire out of said grooves in said clamping frame when said clamping frame is pivoted into contact with said work base comprising
      a pinion positioned on said clamping frame;
      a rack positioned on said wire support frame so as to mesh with said pinion;
      a handle pivotally mounted on said clamping frame and operatively connected to said pinion to rotate said pinion;
      a spring mounted on said clamping frame so as to resist movement of said handle; and
   means to pass current through said wire when said wire is moved out of said grooves in said clamping frame.

References Cited

UNITED STATES PATENTS

| 3,015,600 | 1/1962 | Cook | 156—515 |
| 3,047,991 | 8/1962 | Siegel et al. | 156—515 |
| 3,276,940 | 10/1966 | Shabram | 156—515 |

DOUGLAS J. DRUMMOND, *Primary Examiner.*